(12) United States Patent
Wentink

(10) Patent No.: US 8,619,786 B2
(45) Date of Patent: Dec. 31, 2013

(54) FACILITATING DISTRIBUTED CHANNEL ACCESS FOR TRANSMISSIONS IN A WIRELESS COMMUNICATION ENVIRONMENT

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 12/908,744

(22) Filed: Oct. 20, 2010

(65) Prior Publication Data
US 2012/0099568 A1 Apr. 26, 2012

(51) Int. Cl.
*H04L 12/28* (2006.01)
*H04L 12/56* (2006.01)

(52) U.S. Cl.
USPC ............... 370/395.4; 370/310.2; 370/328; 370/348; 370/350; 370/509; 370/510; 370/511; 370/512; 370/513

(58) Field of Classification Search
USPC ............ 370/278, 282, 310.2, 328, 329, 338, 370/341, 348, 350, 394, 395.4, 419, 420, 370/504, 505, 506, 509–513
See application file for complete search history.

(56) References Cited

U.S. PATENT DOCUMENTS

| | | |
|---|---|---|
| 2006/0062181 A1 | 3/2006 | Chou |
| 2006/0139201 A1 | 6/2006 | Nagata et al. |
| 2006/0227801 A1* | 10/2006 | Nanda et al. ............ 370/447 |
| 2008/0101320 A1 | 5/2008 | Krahn et al. |
| 2009/0147893 A1 | 6/2009 | Takahashi et al. |
| 2009/0252143 A1* | 10/2009 | Sridhara et al. ............ 370/345 |
| 2010/0008318 A1 | 1/2010 | Wentink et al. |
| 2010/0040033 A1 | 2/2010 | Xhafa et al. |
| 2010/0135319 A1 | 6/2010 | Wang et al. |
| 2010/0220654 A1 | 9/2010 | Wentink |
| 2011/0044298 A1 | 2/2011 | Wentink et al. |
| 2011/0064013 A1 | 3/2011 | Liu et al. |
| 2011/0064040 A1 | 3/2011 | Kim et al. |
| 2011/0110454 A1 | 5/2011 | Sampath et al. |
| 2011/0286402 A1* | 11/2011 | Gong ............ 370/329 |
| 2012/0002622 A1 | 1/2012 | Mahadevappa et al. |

(Continued)

FOREIGN PATENT DOCUMENTS

WO WO2010099496 A1 9/2010

OTHER PUBLICATIONS

Draft P802.11z_D2.0, IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 7: Extension to Direct-Link Setup (DLS) (Sep. 30 ,2010).

(Continued)

*Primary Examiner* — Benjamin H Elliott, IV
(74) *Attorney, Agent, or Firm* — Kevin T. Cheatham

(57) ABSTRACT

Methods and apparatuses are provided for facilitating distributed transmissions among a plurality of access terminals for a transmission sequence. An access point may assign a predecessor transmitter device for each of a plurality of access terminals, and may transmit to each access terminal an instruction to follow a respective preceding transmission by the predecessor transmitter. An access terminal may receive the transmission including the instruction, and may monitor for and detect the preceding transmission. The access terminal may then transmit a transmission after the completion of an interframe space that may follow the detected preceding transmission.

53 Claims, 9 Drawing Sheets

(56) References Cited

U.S. PATENT DOCUMENTS

2012/0063335 A1 3/2012 Cho et al.
2012/0063433 A1 3/2012 Wentink
2012/0099568 A1* 4/2012 Wentink .................. 370/338

OTHER PUBLICATIONS

Gill, "Opportunistic Selection With Interference Alignment for Mu-MIMO Networks", April 26, 2011.
IEEE 802.11-2007, "IEEE Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, (Jun. 12, 2007).
International Search Report and Written Opinion—PCT/US2011/056112—ISA/EPO—Dec. 14, 2011.
Siwamogsatham S et al., "On Backoff Timer Scheduling for Smart-DCF and Performance Evaluation", Advanced Information Networking and Applications—Workshops, 2008. AINAW 2008. 22nd International Conference on, IEEE, Piscataway, NJ, USA, Mar. 25, 2008, pp. 1278-1284, XP031240991.
Siwaruk Siwamogsatham, et al., "A Novel Smart-DCF Scheme for High-Speed WLANs", Communications and Information Technologies, 2007. ISCIT '07, International Symposium on, IEEE, P1, Oct. 1, 2007, pp. 1032-1037, XP031166613.

* cited by examiner

FACILITATING DISTRIBUTED CHANNEL ACCESS FOR TRANSMISSIONS IN A WIRELESS COMMUNICATION ENVIRONMENT

BACKGROUND

1. Field

Various features disclosed herein pertain generally to wireless communication systems, and at least some features pertain to devices and methods for facilitating distributed channel access for transmissions from a plurality of access terminals in a wireless communication system.

2. Background

Access terminals, such as laptop computers, personal digital assistant devices, mobile or cellular phones, personal media players, or any other device with a processor, that communicate with other devices through wireless signals are becoming increasingly popular and are used more frequently. Such increases in distribution and use of access terminals have resulted in the need for greater bandwidth. In order to address the issue of increasing bandwidth requirements, different schemes are being developed to allow multiple access terminals to communicate by sharing channel resources while achieving high data throughputs.

Multiple Input or Multiple Output (MIMO) technology represents one such approach that has emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

Spatial Division Multiple Access (SDMA) is a multiple access scheme which enables multiple streams transmitted to different receivers at the same time to share the same frequency channel and, as a result, provide higher user capacity. SDMA is a common and typical MIMO scheme in cellular wireless systems.

Although, MIMO technologies, such as SDMA are effective in allowing multiple access terminals to communicate by sharing channel resources, there remains a need for a solution to facilitate distributed transmissions among a plurality of access terminals during a transmission opportunity.

SUMMARY

Managing the distribution of transmissions among a plurality of access terminals is facilitated by identifying a sequence for distributed transmissions and conveying instructions to the plurality of access terminals to follow a respective preceding transmission according to the identified sequence.

One feature provides access terminals adapted to communicate according to a transmission sequence. Such access terminals may include a communications interface adapted to facilitate wireless communications and a processing circuit coupled to the communications interface. The processing circuit may be adapted to receive a transmission via the communications interface. The received transmission may include an instruction for the access terminal to follow a preceding transmission during a transmission sequence. Upon receipt of the transmission, the processing circuit may be adapted to detect the preceding transmission, and to transmit a transmission after duration of an interframe space following the detected preceding transmission.

A method operational in an access terminal is also provided according to one feature for managing distributed transmissions. For instance, a transmission may be received that includes an instruction for the access terminal to follow a preceding transmission during a transmission sequence. The preceding transmission may be detected, and a transmission may be transmitted after an interframe space following the detected preceding transmission has passed.

Another feature provides access points adapted to manage distributed transmissions. Such an access point may comprise a communications interface adapted to facilitate wireless communications, and a processing circuit coupled to the communications interface. The processing circuit may be adapted to transmit a transmission to each access terminal of a plurality of access terminals. The transmitted transmission includes an instruction for each access terminal to follow a respective preceding transmission during a transmission sequence. The processing circuit may further receive a transmission from each of the plurality of access terminals in a sequential order according to the transmission sequence.

A method operational in an access point is additionally provided according to one feature for managing distributed transmissions. For instance, a sequence for distributed transmissions for a plurality of access terminals may be identified. Subsequently, a transmission may be transmitted to each access terminal of the plurality of access terminals. The transmission may include an instruction for each access terminal to follow a respective preceding transmission according to the identified sequence. Furthermore, a transmission may be received from each of the plurality of access terminals in a sequential order according to the identified sequence.

DETAILED DESCRIPTION

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation. The terms "access point" and "access terminal" as used herein are meant to be interpreted broadly. For example, an "access point" may refer to a device that facilitates wireless connectivity (for one or more access terminals) to a communication or data network. Examples of "access points" may include base stations, Node-B devices, femto cells, pico cells, etc. Furthermore, an "access terminal" may include mobile phones, pagers, wireless modems, personal digital assistants, personal information managers (PIMs), palmtop computers, laptop computers, and/or other mobile communication/computing devices which communicate, at least partially, through a wireless or cellular network.

Overview

One feature provides apparatuses and methods for facilitating distributed uplink transmissions for a plurality of devices during a transmission opportunity in a wireless communications network. An access point may transmit to each of a plurality of access terminals an instruction for each access terminal to follow a respective preceding transmission according to a distributed transmission sequence. When an access terminal detects the preceding transmission, the access terminal will know that it can communicate a transmission as soon as an interframe space has concluded. After the time interval of the interframe space has passed, the access terminal will transmit its transmission.

Exemplary Network Environments

Figure 1:
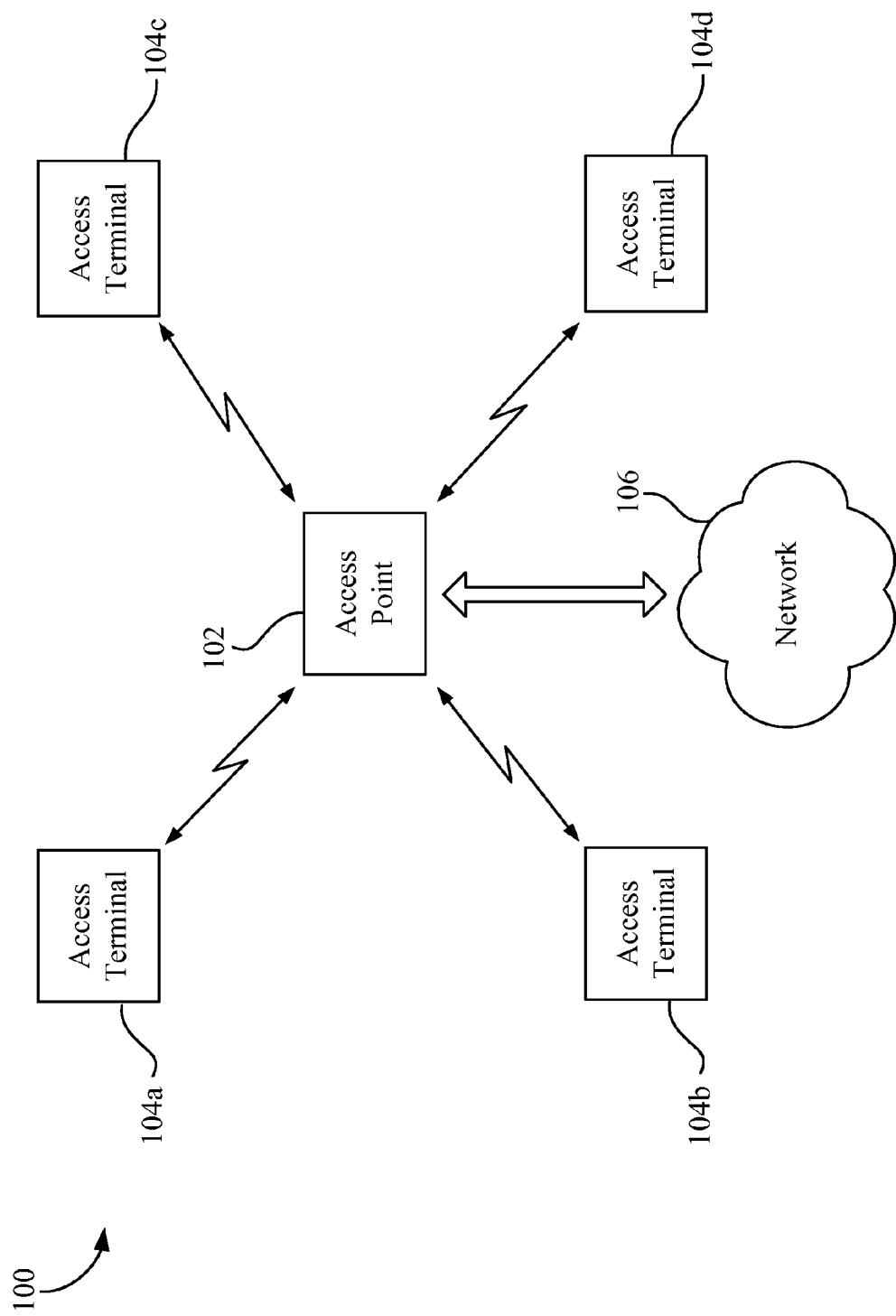
FIG. 1 is a block diagram illustrating how one or more access terminals may operate within a communication network.

FIG. 1 is a block diagram illustrating how one or more access terminals may operate within a wireless communication system. A wireless communication system 100 may include one or more access points 102 in wireless communication with one or more access terminals 104. An access point 102 is adapted to provide access to a communication network 106 for the access terminals 104. The access point 102 may communicate wirelessly with each of the access terminals 104. For example, the access point 102 may send wireless communications to the access terminals 104 over a downlink transmission, and the access terminals 104 may send wireless communications to the access point 102 over an uplink transmission.

Multiple access terminals 104 may be in wireless communication with a single access point 102 at any given time. For example, access terminals 104a, 104b, 104c and 104d may each be in wireless communication with the access point 102 at a particular time. As such, the access point 102 may be adapted to support MIMO technology. In at least one implementation, the access point 102 is adapted to operate in an IEEE 802.11 wireless local area network (WLAN). The access point 102 may be further adapted to employ Spatial Division Multiple Access (SDMA) or other similar technologies. SDMA is a multiple access scheme which enables multiple streams transmitted to different receivers at the same time to share the same frequency channel and, as a result, provide higher user capacity. The access point 102 may therefore be adapted to send wireless transmissions to more than one access terminal 104 during the same time frame. Such communications may be referred to as parallel transmissions in the downlink direction.

In at least some instances, the access terminals 104 may communicate transmissions with the access point 102 in the uplink direction using distributed channel access. For example, each access terminal 104 may communicate a data transmission and/or a response transmission (e.g., transmission of an acknowledgement) in the uplink direction using distributed channel access. In order to facilitate such distributed channel transmissions, the access point 102 may be adapted to manage the channel access distribution sequence among the various access terminals 104 during a particular uplink transmission opportunity by assigning a transmission order to the plurality of access terminals.

Exemplary Schemes for Managing Distributed Uplink Transmissions

Figure 2:
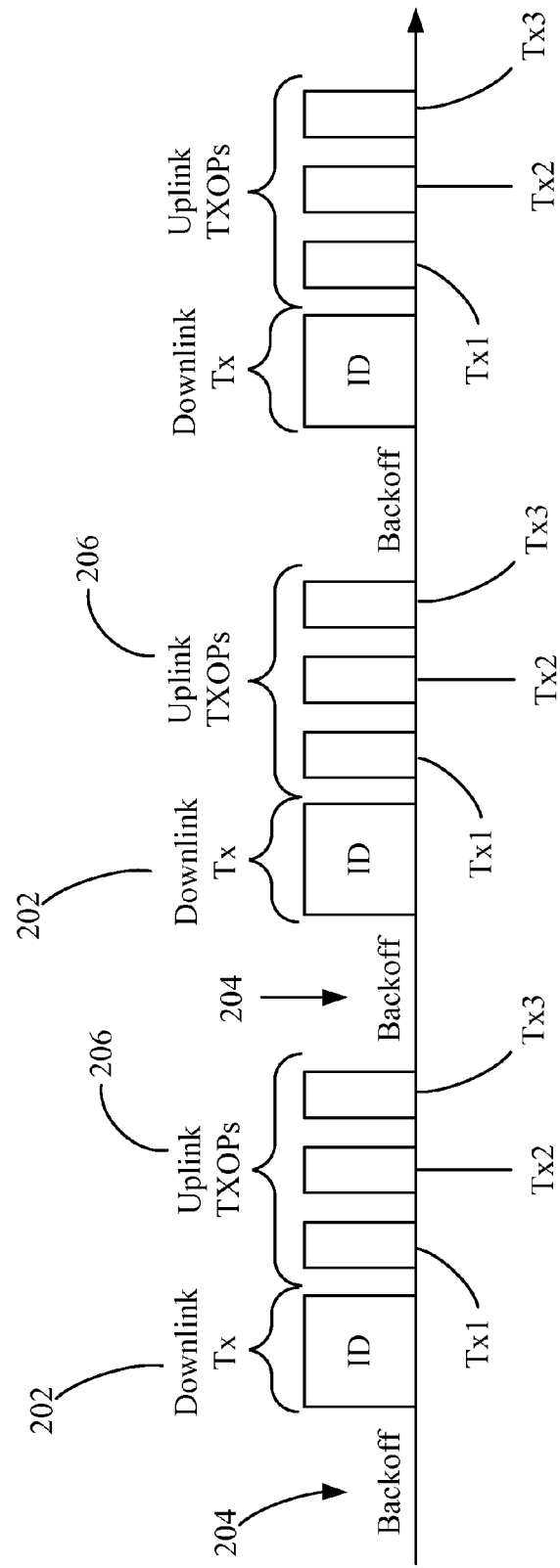
FIG. 2 is a block diagram illustrating an example of a transmission scheme between an access point and multiple access terminals for managing distributed channel access during a transmission opportunity.

Turning to FIG. 2, a block diagram is shown, illustrating an example of a transmission scheme between an access point and multiple access terminals for managing distributed channel access during a transmission opportunity. As illustrated, a transmission 202 may be wirelessly communicated in the downlink direction following a backoff 204. The downlink transmission 202 may be sent by an access point, such as the access point 102 of FIG. 1, to a plurality of access terminals, such as the access terminals 104 of FIG. 1 as either a parallel SDMA transmission or a broadcast (or group) transmission that is not parallel.

The downlink transmission 202 includes an instruction for each access terminal to follow a transmission by a transmitter device, which may also be characterized as a predecessor transmitter device, such as the access point or another access terminal Such instruction may include an identifier associated with the predecessor transmitter device during the a transmission opportunity. By assigning a predecessor transmitter device to each access terminal, the access point defines a sequence in which the access terminals may transmit distributed transmissions during a transmission opportunity 206. According to at least some implementations, the identifier associated with the predecessor transmitter device may comprise a media access control (MAC) address of the predecessor transmitter device. In such implementations, the identifier may be characterized as a predecessor MAC address (PMA).

Employing the identifier associated with the predecessor transmitter device and a predetermined interframe space, each access terminal identifies when it has priority to transmit using a shared transmission channel. That is, each access terminal may recognize its turn to transmit when the access terminal detects a transmission indicating that the predecessor transmitter device assigned to the access terminal has transmitted an uplink transmission, and after a time interval defined by the predetermined interframe space has completed. In some instances, the detected transmission may comprise an uplink transmission by the predecessor transmitter device, if the access terminal is in range to receive such uplink transmissions. In other instances, when the access terminal is not in range to receive an uplink transmission by the predecessor transmitter device, the detected transmission may comprise a downlink response transmission (e.g., an acknowledgement transmission) from the access point that is directed to (e.g., addressed to) the predecessor transmitter device.

A transmission opportunity, identified in FIG. 2 as an uplink TXOPs 206, may follow the transmission 202 that includes the instruction comprising an identification (ID) frame (e.g., the frame including the identifier associated with the predecessor transmitter device). During the uplink transmission opportunity 206, each access terminal may communicate according to the distributed sequence (e.g., Tx1, Tx2, Tx3) defined by the access point with the downlink transmission 202. In at least some implementations, the identifier associated with the predecessor transmitter device assigned to the first access terminal may be an identifier associated with the access point. Accordingly, the access point may initiate the sequence of uplink transmission opportunities 206 by transmitting any frame that includes the access point's identifier in a field of the transmission packet. According to a feature, a conventional backoff-based access to the uplink channel for an access terminal may be suspended by the access terminal when the distributed channel access is enabled (i.e., when an identifier is received by the access terminal).

According to at least one feature of the transmission scheme shown in FIG. 2, an access point may manage repeated sequences of uplink transmission opportunities 206 by repeatedly communicating a transmission 202 in the downlink direction including the ID frame specifying the identifier associated with the predecessor transmitter device for the access terminals in the sequence of uplink transmission opportunities 206, or the ID frame may infer a set of identifiers that was assigned previously. The access point can insert a regular backoff 204 between start frames by waiting for the duration of the backoff 204 before transmitting the start frames. The access point may keep track of the activity level of each of the access terminals to determine whether a predecessor transmitter device should be assigned to a particular access terminal In the event that a predecessor transmitter device has been assigned to an access terminal that has no data to be transmitted in the uplink direction, the access terminal may transmit a clear-to-send (CTS) frame addressed to itself or a Null frame in order to allow the train of responses to continue for any subsequent access terminal The repeated sequences of uplink transmission opportunities 206 may be disabled by transmitting an ID disable frame from the access point to the access terminals, or by transmitting an ID frame that specifies no predecessor transmitter devices.

Figure 3:
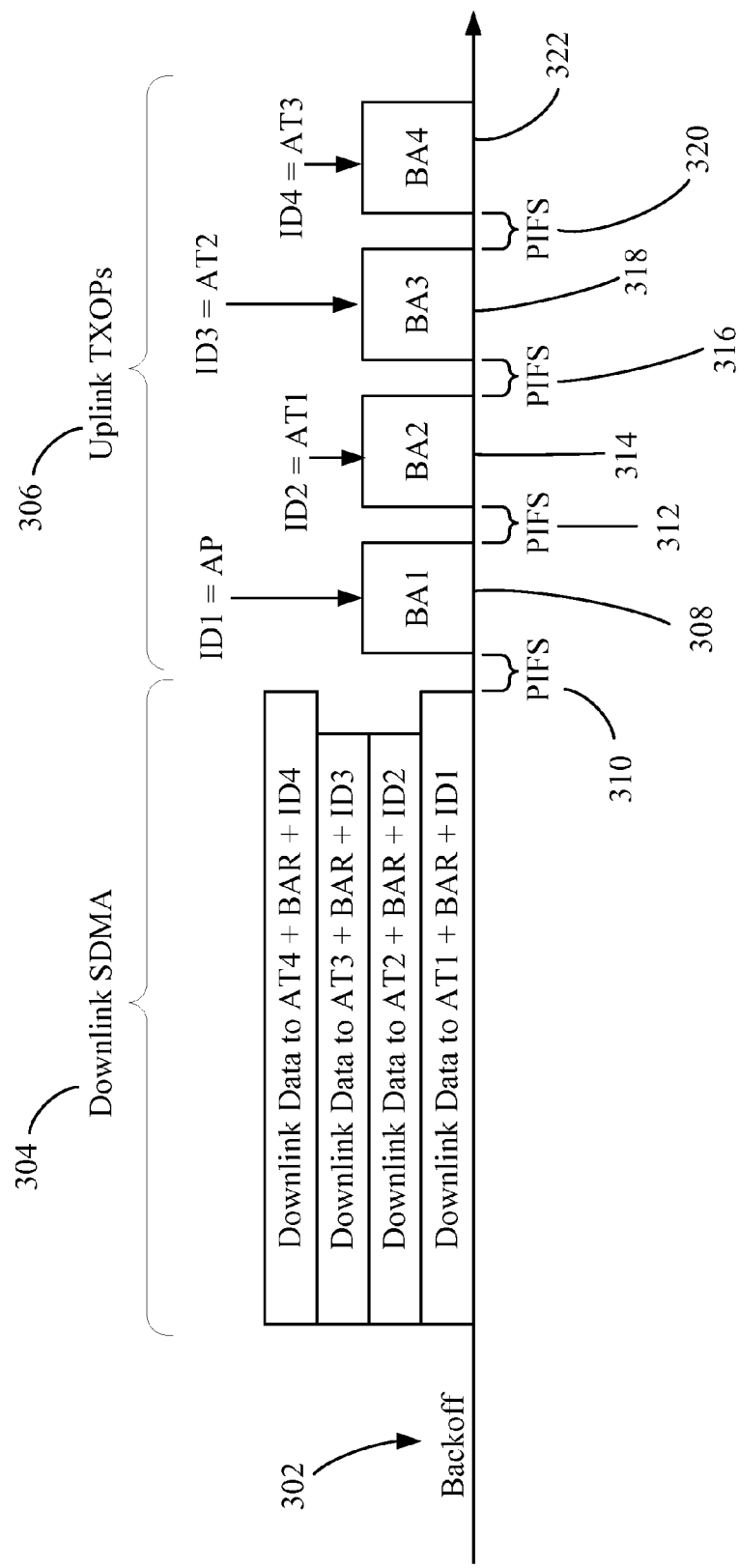
FIG. 3 is a block diagram illustrating an example of a transmission scheme including a downlink SDMA transmission and distributed channel access for uplink transmissions.

Some examples of various implementations of such transmission schemes are described in further detail with reference to FIGS. 3-5. FIG. 3 is a block diagram illustrating an example of a transmission scheme between an access point and multiple access terminals including a SDMA downlink transmission and distributed channel access for uplink transmissions. After a backoff 302, an access point may communicate a parallel SDMA transmission 304 in the downlink direction for a plurality of access terminals AT1, AT2, AT3 and AT4. The downlink SDMA transmission 304 for each access terminal, AT1-AT4, may comprise an aggregated media access control (MAC) protocol data unit (A-MPDU) including downlink data for each particular access terminal, a block acknowledgement request (BAR) (or an implicit BAR) and an ID frame. The block acknowledgement request is a request for the receiving access terminal to transmit a block acknowledgement (BA) to the access point in the next uplink transmission opportunity the access terminal obtains.

With receipt of the downlink transmission, each access terminal is assigned a sequence position for a subsequent uplink transmission opportunity 306 by the ID frame. As noted above, the ID frame includes an identifier associated with the predecessor transmitter device assigned to each particular access terminal for determining when the access terminal has priority to transmit during the uplink transmission opportunities.

In the illustrated example, the access terminal AT1 may be assigned to follow the access point. Accordingly, the ID frame in the downlink transmission 304 for the access terminal AT1 may include an identifier associated with the access point (e.g., the MAC address for the access point). The access terminal AT2 may be assigned to follow the access terminal AT1, and therefore receives an identifier associated with the access terminal AT1 (e.g., the MAC address of AT1) in the ID frame in the downlink transmission 304. Similarly, the access terminal AT3 may be assigned to follow the access terminal AT2, and may therefore receive an identifier associated with the access terminal AT2 (e.g., the MAC address of AT2) in the ID frame in the downlink transmission 304 for the access terminal AT3. Finally, the access terminal AT4 may be assigned to follow the access terminal AT3, and therefore receives an identifier associated with the access terminal AT3 (e.g., the MAC address of AT3) in the ID frame in the downlink transmission 304 for the access terminal AT4. Given these predecessor transmitter devices as assigned, the access point has effectively defined a distributed transmission sequence beginning with access terminal AT1 and ending with access terminal AT4 (i.e., AT1, AT2, AT3 and then AT4), in which the access terminals may communicate during the uplink transmission opportunity 306.

Since the access terminal AT1 is assigned to follow the access point, the access terminal AT1 may transmit the requested block acknowledgement (BA1) 308 after the duration of an interframe space following the downlink transmission from the access point. The interframe space is a known time interval in which there is no traffic on the transmission channel. The access terminal is adapted to wait until a moment after the downlink transmission when there has been a period of time defined by the time interval in which no transmissions have occurred on the transmission channel. In the implementation shown, the interframe space comprises a time interval defined by a point coordination function (PCF) interframe space (PIFS) 310. A PCF interframe space (PIFS) is conventionally used in IEEE 802.11 based Wireless LANs for defining a fixed time interval to wait before occupying the wireless medium. Accordingly, the access terminal AT1 may transmit the requested block acknowledgement 308 after the PCF interframe space (PIFS). It is noted that according to various implementations, any other suitable interframe space (IFS) may be selected in alternative to a PCF interframe space (PIFS). For example, the interframe space may comprise a short interframe space (SIFS), a distributed coordination function (DCF) interframe space (DIFS), an arbitration interframe space (AIFS), or any other suitable interframe space.

After the block acknowledgement (BA1) 308 is transmitted from the access terminal AT1, the access terminal AT2, which was assigned to follow the access terminal AT1, may detect the uplink transmission from the access terminal AT1 and identify that it has priority for the next uplink transmission opportunity 306. That is, the access terminal AT2 may identify that it may communicate an uplink transmission after the next duration of an interframe space (IFS). Accordingly, after the duration of the interframe space (IFS) 312, the access terminal AT2 may transmit the requested block acknowledgement (BA2) 314.

Similarly, after the block acknowledgement (BA2) 314 is transmitted from the access terminal AT2, the access terminal AT3 assigned to follow the access terminal AT2 may detect the uplink transmission from the access terminal AT2 and identify that it has priority for the next uplink transmission opportunity 306. After the duration of another interframe space (IFS) 316, the access terminal AT3 may transmit the requested block acknowledgement (BA3) 318.

Finally, after the block acknowledgement (BA3) 318 is transmitted from the access terminal AT3, the access terminal AT4 assigned to follow the access terminal AT3 may observe the uplink transmission from the access terminal AT3 and identify that it has priority for the next uplink transmission opportunity 306. After the duration of another interframe space (IFS) 320, the access terminal AT4 may transmit the requested block acknowledgement (BA4) 322.

Figure 4:
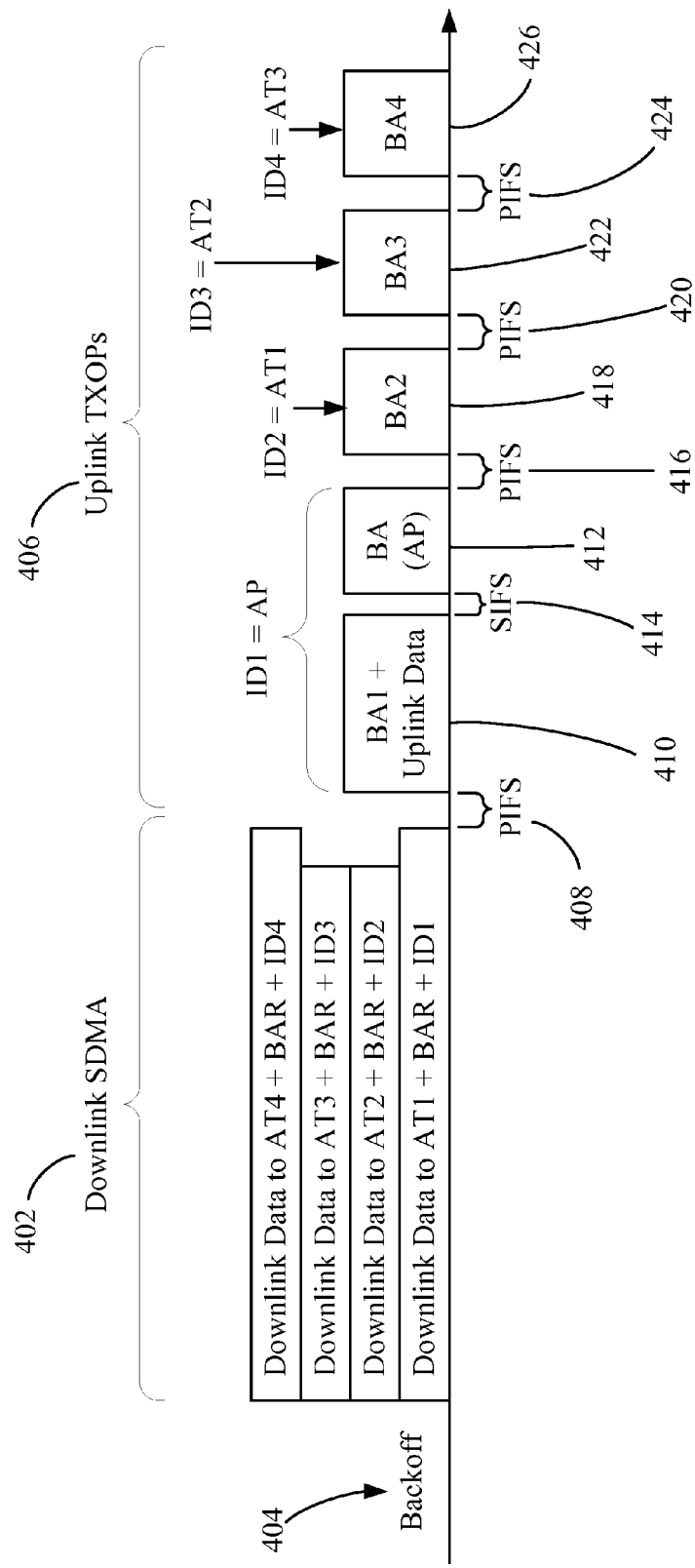
FIG. 4 is a block diagram illustrating an example of a transmission scheme between an access point and multiple access terminals including distributed channel access for uplink transmissions including data.

FIG. 4 is a block diagram illustrating an example of a transmission scheme between an access point and multiple access terminals including distributed channel access for uplink transmissions including data. Similar to the scheme described above with reference to FIG. 3, an access point may communicate a parallel downlink SDMA transmission 402 for a plurality of access terminals AT1, AT2, AT3 and AT4 following a backoff 404. The downlink SDMA transmission 402 may comprise an aggregated MAC protocol data unit (A-MPDU) including downlink data for each particular access terminal, a block acknowledgement request (BAR) frame and an ID frame. In this example, the selected interframe space (IFS) must be larger than a short interframe space (SIFS) (e.g. PIFS, DIFS, AIFS) to avoid collisions with immediate response frames from the access point, such as the block acknowledgment BA(AP) 412 described below.

The ID frame assigns a position in a distributed sequence of uplink transmissions for an uplink transmission opportunity 406. For example, the access terminal AT1 may be assigned to follow the access point, and may accordingly receive an identifier associated with the access point (e.g., the MAC address of the access point) in the ID frame in the downlink transmission 402 for the access terminal AT1. The access terminal AT2 may be assigned to follow the access terminal AT1, and therefore receives an identifier associated with the access terminal AT1 (e.g., the MAC address of AT1) in the ID frame in the downlink transmission 402. Similarly, the access terminal AT3 may be assigned to follow the access terminal AT2, and may therefore receive an identifier associated with the access terminal AT2 (e.g., the MAC address of AT2) in the ID frame in the downlink transmission 402 for the access terminal AT3. Finally, the access terminal AT4 may be assigned to follow the access terminal AT3, and therefore receives an identifier associated with the access terminal AT3 (e.g., the MAC address of AT3) in the ID frame in the downlink transmission 402 for the access terminal AT4.

The access terminal AT1 may be the first to communicate an uplink transmission during the uplink transmission opportunity 406, since the access terminal AT1 is assigned to follow the access point. Therefore, after a PCF interframe space (PIFS) 408 following the downlink SDMA transmission 402 from the access point, the access terminal AT1 communicates an uplink transmission 410. It is noted that the interframe space may alternatively be, for example, a short interframe space (SIFS), because this transmission follows immediately after the downlink transmission from the access point. In the example of FIG. 4, the uplink transmission from the access terminal AT1 comprises an aggregated MAC protocol data unit (A-MPDU) including the requested block acknowledgement (BA1) as well as uplink data. The transmission of uplink data from the access terminal AT1 may carry an implied request for the access point to transmit a block acknowledgement, or the A-MPDU may include a block acknowledgement request frame with immediate acknowledgement policy. Accordingly, the access point may transmit a block acknowledgement (BA(AP)) 412 following the duration of a short interframe space (SIFS) 414. The short interframe space (SIFS) 414 comprises a time interval that is shorter than the time interval of a PCF interframe space (PIFS). Because the short interframe space (SIFS) is shorter than a PCF interframe space (PIFS), the access terminal AT2, assigned to follow the access terminal AT1, does not communicate an uplink transmission until after the block acknowledgement 412 from the access point. That is, since duration of a PCF interframe space (PIFS) has not been completed before the downlink transmission of the block acknowledgement, (e.g., the access point transmitted the downlink block acknowledgment after a short interframe space (SIFS) and before the time interval defined by the PCF interframe space (PIFS) was completed), the access terminal AT2 does not begin its uplink transmission.

After the duration of a PCF interframe space (PIFS) 416 following the uplink transmission 410 from the access terminal AT1, the access terminal AT2, which was assigned to follow the access terminal AT1, may transmit the requested block acknowledgement (BA2) 418.

Similarly, after the block acknowledgement (BA2) 418 is transmitted from the access terminal AT2, the access terminal AT3 assigned to follow the access terminal AT2 may detect the uplink transmission from the access terminal AT2 and identify that it has priority for the next uplink transmission opportunity 406. After the duration of another PCF interframe space (PIFS) 420, the access terminal AT3 may transmit the requested block acknowledgement (BA3) 422.

Finally, after the block acknowledgement (BA3) 422 is transmitted from the access terminal AT3, the access terminal AT4 assigned to follow the access terminal AT3 may detect the uplink transmission from the access terminal AT3 and identify that it has priority for the next uplink transmission opportunity 406. After the duration of another PCF interframe space (PIFS) 424, the access terminal AT4 may transmit the requested block acknowledgement (BA4) 426.

Figure 5:
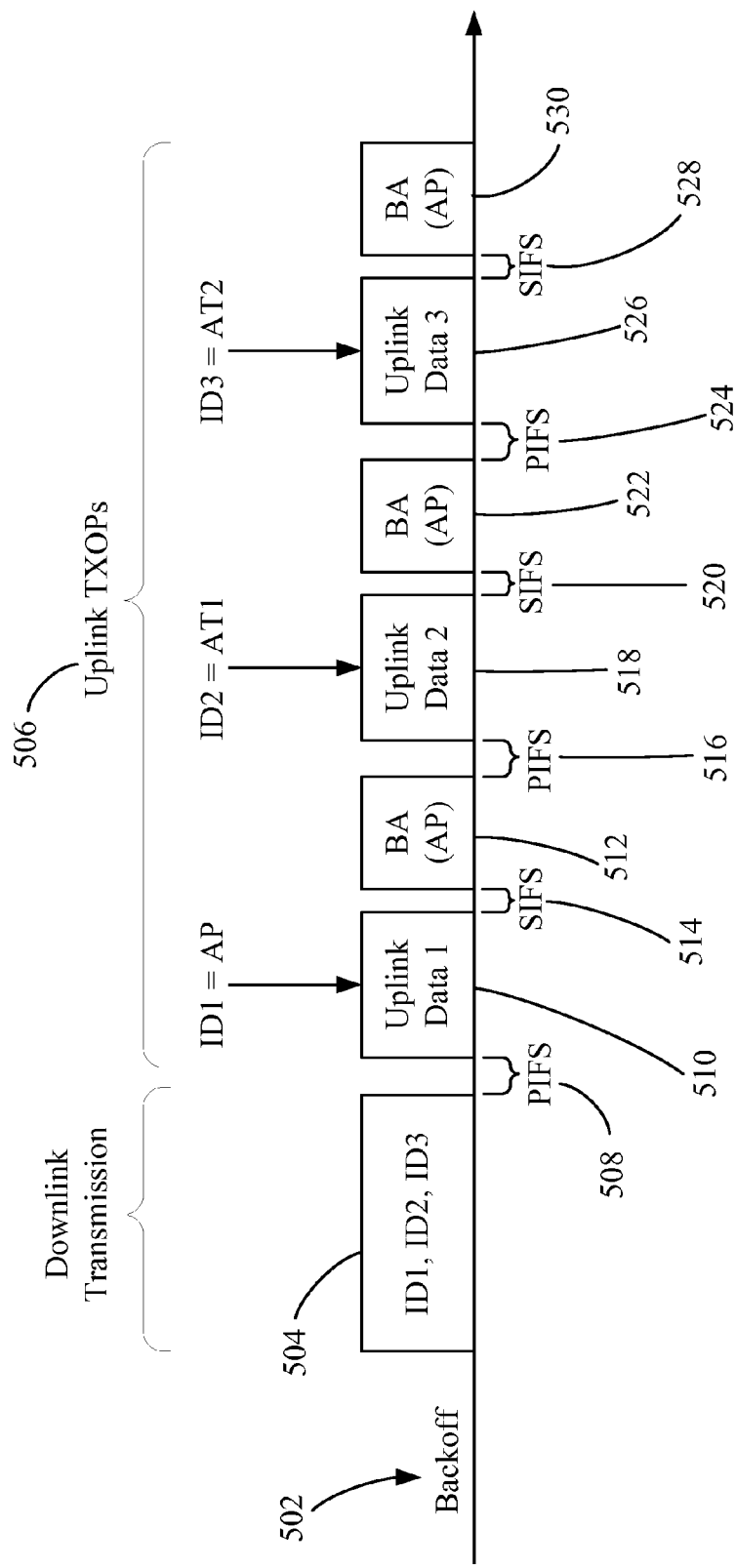
FIG. 5 is a block diagram illustrating an example of a transmission scheme between an access point and multiple access terminals including a downlink transmission that is not a parallel transmission.

FIG. 5 is a block diagram illustrating an example of a transmission scheme between an access point and multiple access terminals including a downlink group transmission that is not a parallel transmission. After a backoff 502, the access point may transmit a downlink broadcast transmission including an ID frame 504 that specifies the identifier associated with the predecessor transmitter device for each of a plurality of access terminals, such as AT1, AT2 and AT3. In the present example, the predecessor transmitter device assigned to the access terminal AT1 may be the access point, and the transmitted identifier may be an identifier associated with the access point (e.g., the MAC address of the access point). The predecessor transmitter device assigned to the access terminal AT2 may be the access terminal AT1, and the transmitted identifier may be an identifier associated with the access terminal AT1 (e.g., the MAC address of the access terminal AT1). Finally, the predecessor transmitter device assigned to the access terminal AT3 may be the access terminal AT2, and the transmitted identifier may be an identifier associated with the access terminal AT2 (e.g., the MAC address of the access terminal AT2).

The access terminal AT1 may be the first to communicate an uplink transmission during the uplink transmission opportunity 506, since the access terminal AT1 is assigned to follow the access point. Therefore, after a PCF interframe space (PIFS) 508 following the downlink transmission broadcast 504 from the access point, the access terminal AT1 may communicate an uplink transmission 510. In this example, the uplink transmission from the access terminal AT1 may comprise an aggregated MAC protocol data unit (A-MPDU) including uplink data (uplink data 1). The access point may transmit a block acknowledgement (BA(AP)) 512 to the access terminal AT1 following a short interframe space (SIFS) 514 to confirm receipt of the uplink data (uplink data 1). It is noted that since AT1 is scheduled immediately after the downlink transmission, the interframe space may be reduced to from a PCF interframe space (PIFS) to a short interframe space (SIFS).

After the access terminal AT2 detects at least one of either the uplink transmission 510 by the access terminal AT1 or the block acknowledgement 512 sent to the access terminal AT1, the access terminal AT2 may wait for the completion of a PCF interframe space (PIFS) 516, at which time the access terminal AT2 communicates an uplink transmission (uplink data 2) 518. After a short interframe space (SIFS) 520, the access point transmits a block acknowledgement 522 to the access terminal AT2 to confirm receipt of the uplink data (uplink data 2).

Similarly, after the access terminal AT3 detects at least one of either the uplink transmission 518 by the access terminal AT2 or the block acknowledgement 522 sent to the access terminal AT2, the access terminal AT3 communicates an uplink transmission (uplink data 3) 526 after the duration of a PCF interframe space (PIFS) 524. Following a short interframe space (SIFS) 528, the access point transmits a block acknowledgement 530 to the access terminal AT3.

Figure 6:
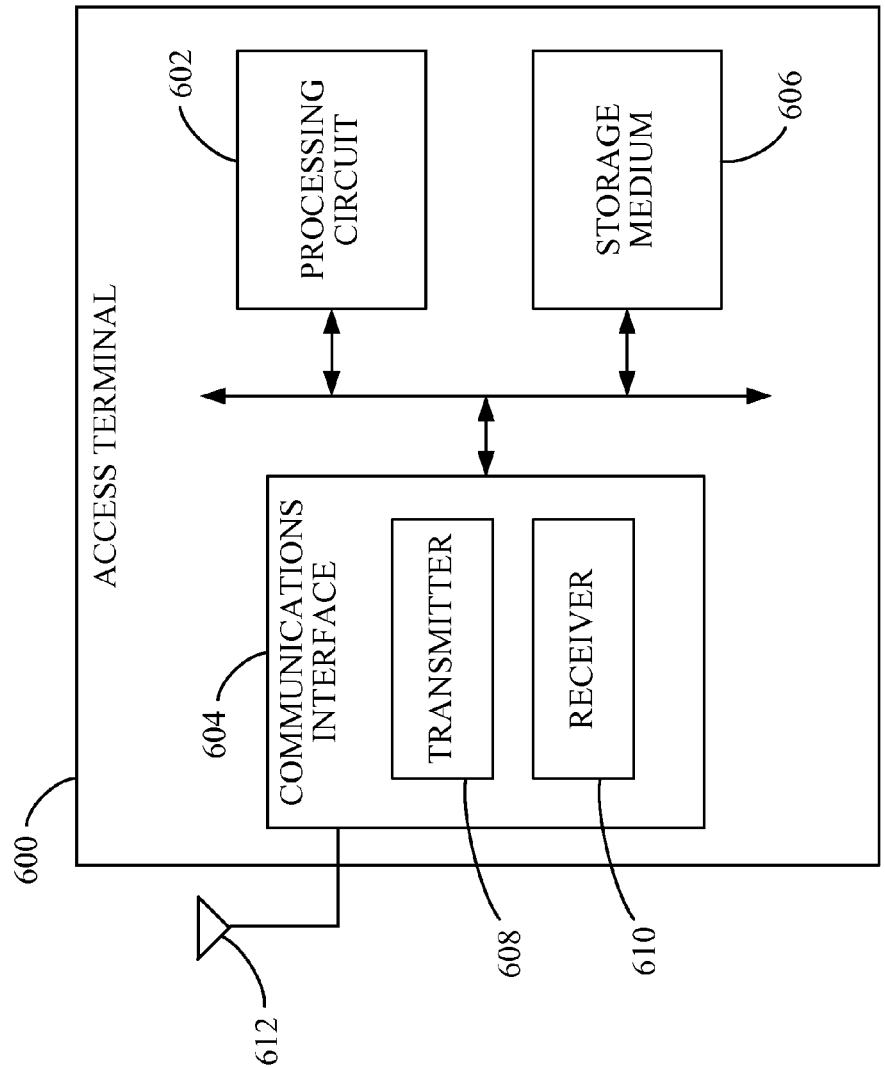
FIG. 6 is a block diagram illustrating select components of an access terminal according to at least one implementation.

In all of the forgoing examples, the receipt of the right predecessor frame, or more general, the occurrence of the right sequence of events enables PIFS access at the access terminal Exemplary Access Terminal FIG. 6 is a block diagram illustrating select components of an access terminal 600 according to at least one implementation. The access terminal 600 may include a processing circuit 602 coupled to a communications interface 604 and to a storage medium 606.

The processing circuit 602 is arranged to obtain, process and/or send data, control data access and storage, issue commands, and control other desired operations. The processing circuit 602 may comprise circuitry configured to implement desired programming provided by appropriate media in at least one embodiment. For example, the processing circuit 602 may be implemented as one or more of a processor, a controller, a plurality of processors and/or other structure configured to execute executable instructions including, for example, software and/or firmware instructions, and/or hardware circuitry. Embodiments of the processing circuit 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 602 are for illustration and other suitable configurations within the scope of the present disclosure are also contemplated.

The communications interface 604 is configured to facilitate wireless communications of the access terminal 600. The communications interface 604 may include at least one transmitter 608 and/or at least one receiver 610 (e.g., one or more transmitter/receiver chains). Furthermore, one or more antennas 612 may be electrically coupled to the communications interface 604.

The storage medium 606 may represent one or more devices for storing programming and/or data, such as processor executable code or instructions (e.g., software, firmware), electronic data, databases, or other digital information. The storage medium 606 may be any available media that can be accessed by a general purpose or special purpose processor. By way of example and not limitation, the storage medium 606 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 606 may be coupled to the processing circuit 602 such that the processing circuit 602 can read information from, and write information to, the storage medium 606. In the alternative, the storage medium 606 may be integral to the processing circuit 602.

According to one or more features, the processing circuit 602 may be adapted to perform any or all of the processes, functions, steps and/or routines related to the various access terminals as described herein above with reference to FIGS. 1-5 (e.g., access terminal 104, AT1, AT2, AT3 and/or AT4). As used herein, the term "adapted" in relation to the processing circuit 602 may refer to the processing circuit 602 being one or more of configured, employed, implemented, or programmed to perform a particular process, function, step and/or routine according to various features.

Figure 7:
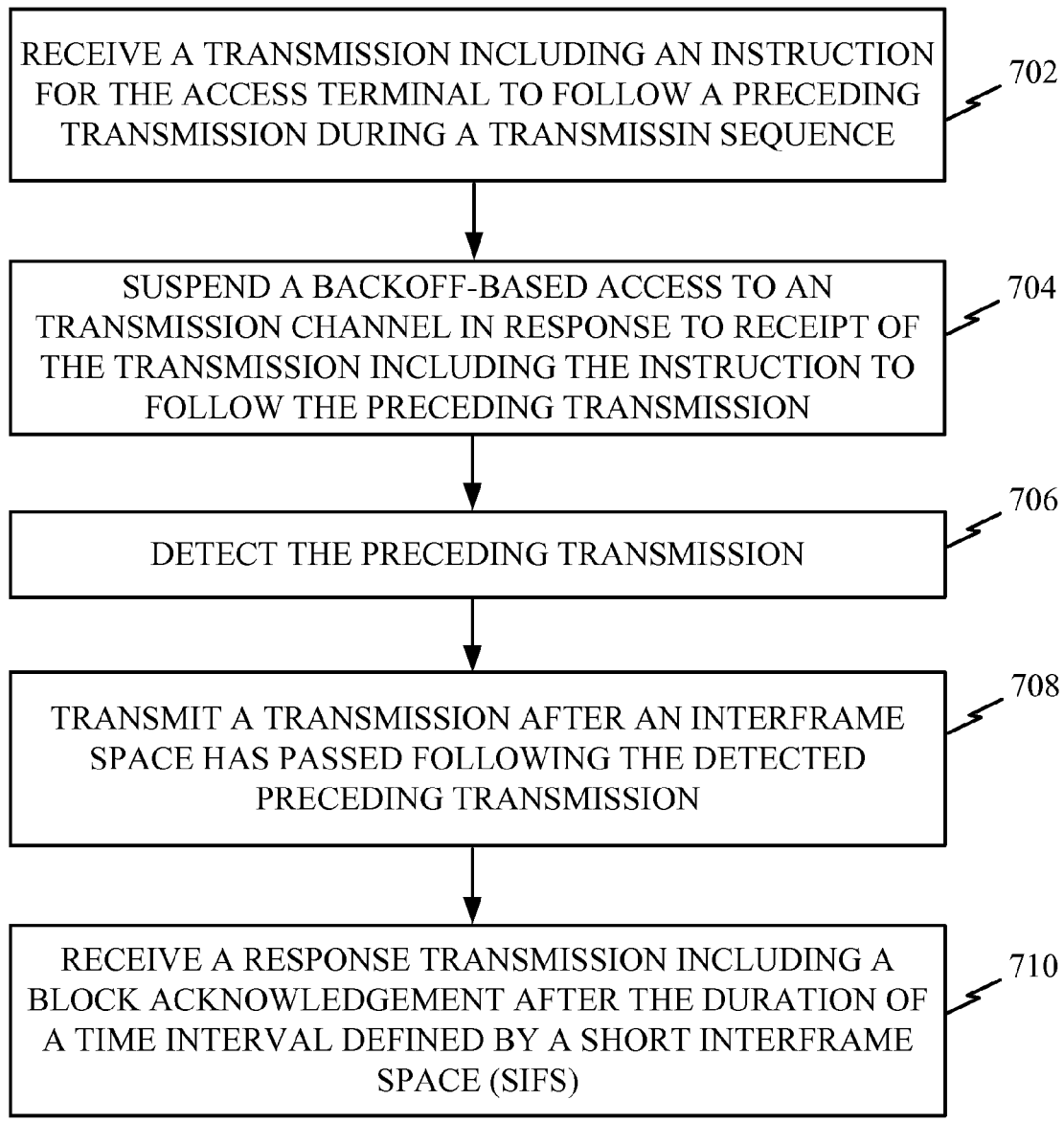
FIG. 7 is a flow diagram illustrating an example of at least one implementation of a method operational on an access terminal.

FIG. 7 is a flow diagram illustrating an example of at least one implementation of a method operational on an access terminal, such as the access terminal 600. With reference to both of FIGS. 6 and 7, a transmission (e.g., in the downlink direction) may be received at step 702. The transmission may include an instruction for the access terminal 600 to follow a preceding transmission during a transmission sequence. For example, a transmission may be wirelessly transmitted from an access point, and may be received by the processing circuit 602 via the communications interface 604. The processing circuit 602 may process the instructions to enable the processing circuit 602 to identify the preceding transmission. According to at least one embodiment, the instructions may include an identifier associated with a predecessor transmitter device whose transmission the access terminal 600 is assigned to follow in the transmission sequence. In such embodiments, the processing circuit 602 may store the identifier associated with the assigned predecessor transmitter device in the storage medium 606. According to at least some implementations, the identifier associated with the predecessor transmitter device may comprise a MAC address of the transmitter device.

Upon receipt of the downlink transmission including the instruction to follow the preceding transmission, the processing circuit 602 may suspend a backoff-based access to an uplink channel of the access terminal 600 at step 704, if such backoff-based access is being employed by the access terminal 600 for channel access.

At step 706, the access terminal 600 may detect the preceding transmission. For example, employing the received and stored identifier, the processing circuit 602 may detect transmissions between other devices (e.g., the access point and other access terminals) to identify a preceding transmission defined by the identifier associated with the predecessor transmitter device. That is, the processing circuit 602 may detect a preceding transmission that originates from the predecessor transmitter device, or a response transmission that is addressed to the predecessor transmitter device and is transmitted in response to the transmission by the predecessor transmitter device.

A transmission may then be transmitted after an interframe space has passed subsequent to the detected preceding transmission 708. For example, the processing circuit 602 may transmit the transmission via the communications interface 604. The transmission may include a block acknowledgement and/or data. If the access terminal 600 has no information prepared to be sent by the transmission, then the access terminal may transmit either a clear-to-send frame addressed to itself, or a Null frame. According to a feature, the interframe space that access terminal 600 must wait after the preceding transmission before transmitting the transmission may comprise a time interval defined by one of a short interframe space (SIFS), a point coordination function (PCF) interframe space (PIFS), a distributed coordination function (DCF) interframe space (DIFS), or an arbitration interframe space (AIFS).

In some implementations, for example when the transmission transmitted by the access terminal 600 includes data, a response transmission may be received that includes a block acknowledgement 710. The response block acknowledgement may be received after the duration of another time interval defined by a short interframe space (SIFS). For example, the processing circuit 602 may receive the response transmission from an access point via the communications interface 604.

Exemplary Access Point

Figure 8:
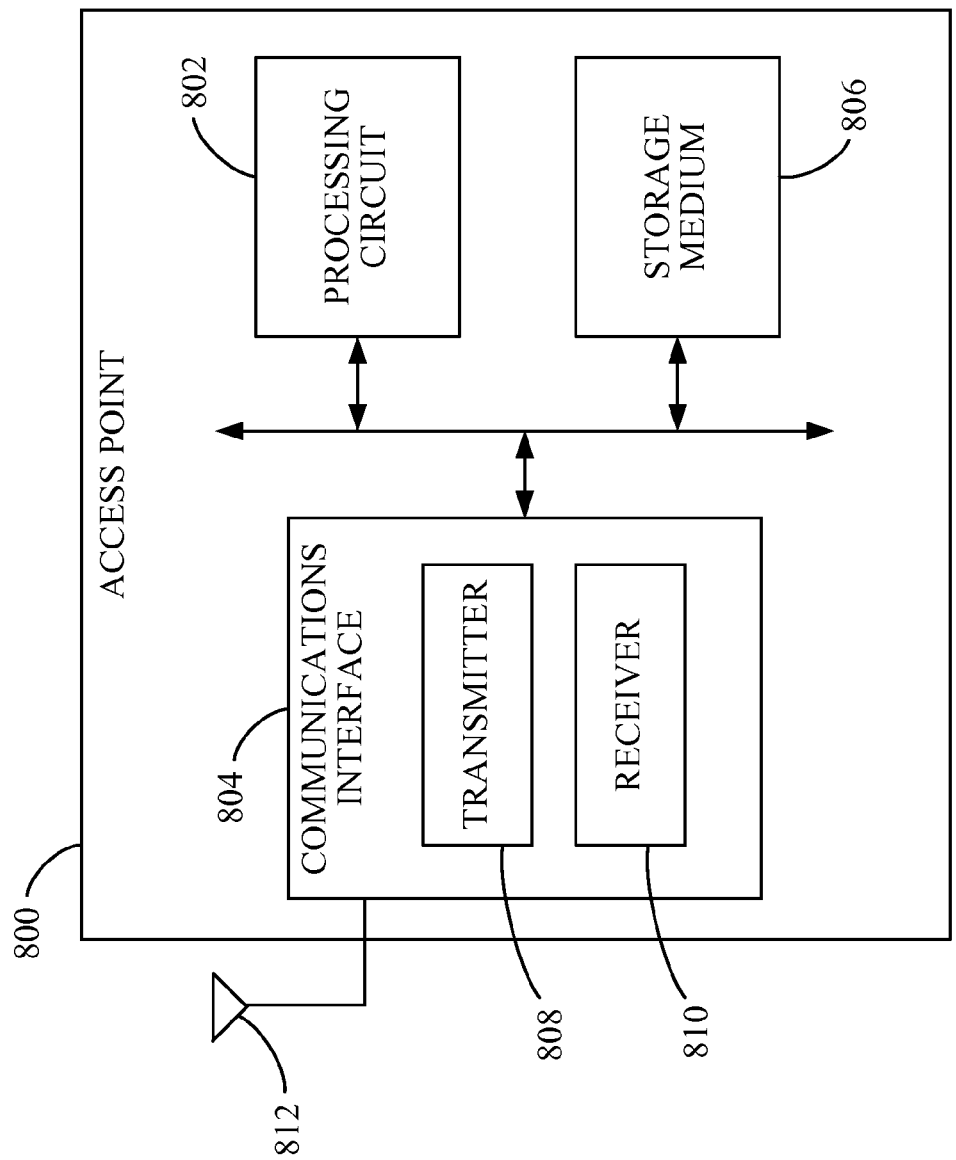
FIG. 8 is a block diagram illustrating select components of an access point according to at least one implementation.

FIG. 8 is a block diagram illustrating select components of an access point according to at least one implementation. As shown, an access point 800 may include a processing circuit 802 coupled to a communications interface 804 and to a storage medium 806.

The processing circuit 802 is arranged to obtain, process and/or send data, control data access and storage, issue commands, and control other desired operations. The processing circuit 802 may comprise circuitry configured to implement desired programming provided by appropriate media in at least one embodiment. For example, the processing circuit 802 may be implemented as one or more of a processor, a controller, a plurality of processors and/or other structure configured to execute executable instructions including, for example, software and/or firmware instructions, and/or hardware circuitry. Embodiments of the processing circuit 802 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 802 are for illustration and other suitable configurations within the scope of the present disclosure are also contemplated.

The communications interface 804 is configured to facilitate wireless communications of the access point 800. The communications interface 804 may include at least one transmitter 808 and/or at least one receiver 810 (e.g., one or more transmitter/receiver chains). Furthermore, one or more antennas 812 may be electrically coupled to the communications interface 804.

The storage medium 806 may represent one or more devices for storing programming and/or data, such as processor executable code or instructions (e.g., software, firmware), electronic data, databases, or other digital information. The storage medium 806 may be any available media that can be accessed by a general purpose or special purpose processor. By way of example and not limitation, the storage medium 806 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 806 may be coupled to the processing circuit 802 such that the processing circuit 802 can read information from, and write information to, the storage medium 806. In the alternative, the storage medium 806 may be integral to the processing circuit 802.

According to one or more features, the processing circuit 802 may be adapted to perform any or all of the processes, functions, steps and/or routines related to the various access points as described herein above with reference to FIGS. 1-5 (e.g., access point 102). As used herein, the term "adapted" in relation to the processing circuit 802 may refer to the processing circuit 802 being one or more of configured, employed, implemented, or programmed to perform a particular process, function, step and/or routine according to various features.

Figure 9:
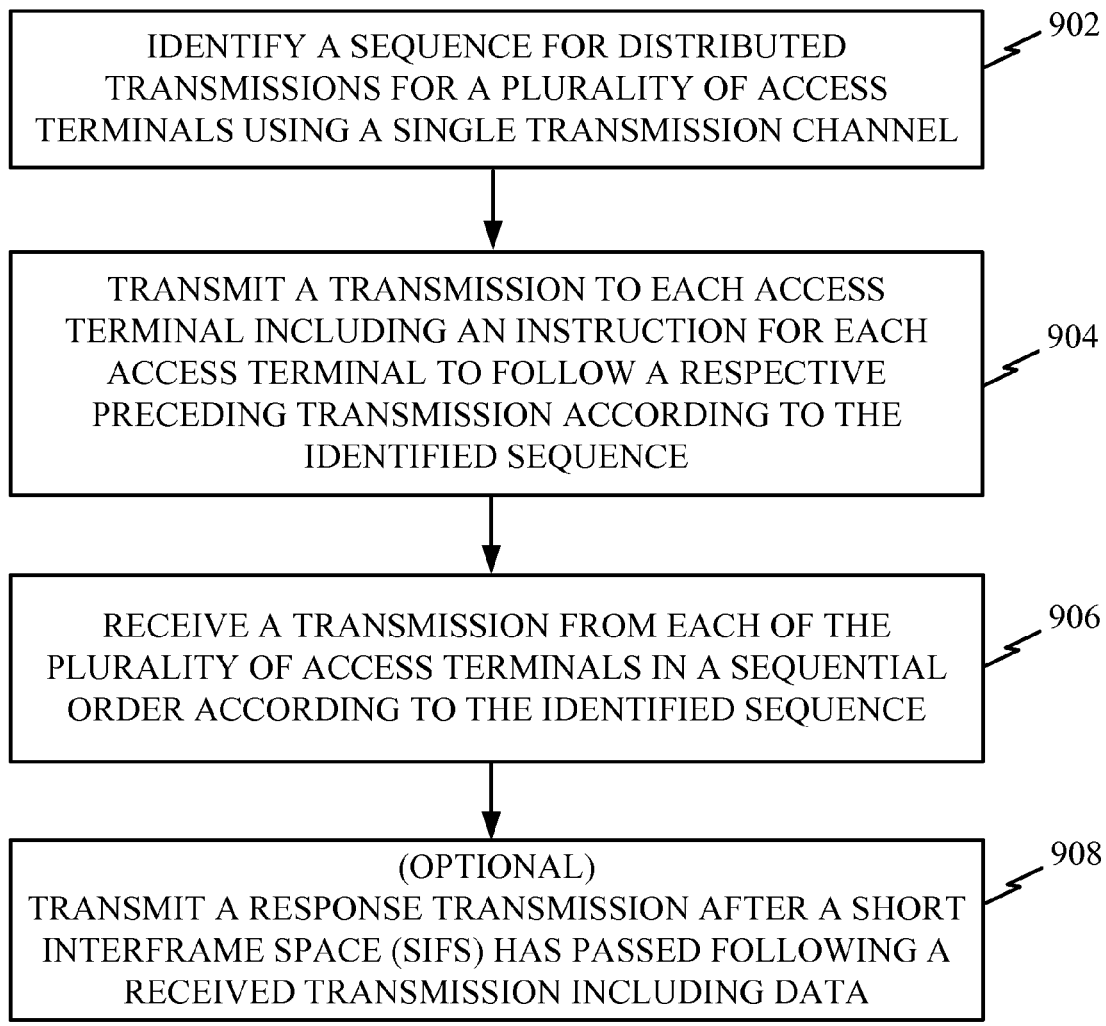
FIG. 9 is a flow diagram illustrating an example of at least one implementation of a method operational on an access point.

FIG. 9 is a flow diagram illustrating an example of at least one implementation of a method operational on an access point, such as access point 800. With reference to both of FIGS. 8 and 9, the access point 800 may identify a sequence for distributed transmissions (e.g., in the uplink direction) for a plurality of access terminals using a common transmission channel 902. For example, a plurality of access terminals that are actively transmitting in the uplink direction may be identified. The processing circuit 802 may determine or may receive a sequence that assigns a particular order to each active access terminal of the plurality of access terminals. That is, each access terminal is assigned a respective predecessor transmitter device (e.g., another access terminal or the access point 800) whose transmission the access terminal is to follow.

A transmission may be transmitted to each of the access terminals with an instruction for each access terminal to follow a respective preceding transmission according to the identified sequence 904. For example, the processing circuit 802 may transmit via the communications interface 804 a downlink transmission as either a parallel SDMA transmission or a non-parallel group transmission. The downlink transmission from the access point 800 may also include downlink data for each of the plurality of access terminals. The instruction for each access terminal may include an instruction to follow a preceding transmission defined by an identifier associated with a respective predecessor transmitter device that each access terminal is assigned to follow. That is, the instruction may include an identifier associated with the respective predecessor transmitter device, which identifier may be employed by the respective access terminal for detecting a transmission by the predecessor transmitter device.

A plurality of transmissions may be received in a sequential order according to the identified sequence 906. For example, the processing circuit 802 may receive, via the communications interface 804, a plurality of uplink transmissions from the plurality of access terminals. The plurality of transmissions may each be received in the identified order, where each access terminal transmits a transmission after a preceding transmission by the assigned predecessor transmitter device and after the duration of an interframe space (e.g., a PCF interframe space (PIFS)).

When at least one of the received transmissions includes data, a response transmission may optionally be communicated after a passage of a time interval defined by a short interframe space (SIFS) 908. The response transmission may include a block acknowledgement to acknowledge receipt of the at least one uplink transmission including the uplink data.

One or more of the components, steps, features and/or functions illustrated in FIGS. 1, 2, 3, 4, 5, 6, 7, 8 and/or 9 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 6, and/or 8 may be configured to perform one or more of the methods, features, or steps described in FIGS. 2, 3, 4, 5, 7, and/or 9. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An access terminal, comprising:
   a communications interface configured to facilitate wireless communications; and
   a processing circuit coupled to the communications interface, the processing circuit configured to:
   receive a transmission via the communications interface, the received transmission including an instruction for the access terminal to follow a preceding transmission during a transmission sequence;
   suspend a backoff-based access to an uplink channel in response to the receipt of the transmission including the instruction for the access terminal to follow the preceding transmission;
   detect the preceding transmission; and
   transmit a transmission, via the communications interface, after a duration of an interframe space following the detected preceding transmission.

2. The access terminal of claim 1, wherein the communications interface is configured to facilitate wireless communications in an Institute of Electrical Engineers (IEEE) 802.11 wireless local area network (WLAN).

3. The access terminal of claim 1, wherein the preceding transmission includes an identifier that is associated with a transmitter device that the access terminal is assigned to follow.

4. The access terminal of claim 3, wherein the identifier associated with the transmitter device comprises a media access control (MAC) address of the transmitter device.

5. The access terminal of claim 1, wherein the interframe space comprises a time interval defined by one of a short interframe space (SIFS), a point coordination function (PCF) interframe space (PIFS), a distributed coordination function (DCF) interframe space (DIFS), or an arbitration interframe space (AIFS).

6. The access terminal of claim 1, wherein the transmission transmitted from the access terminal includes a clear-to-send (CTS) frame addressed to the access terminal or a Null frame when there is no other information prepared to be included in the transmitted transmission.

7. The access terminal of claim 1, wherein the transmission transmitted from the access terminal includes data, and the processing circuit is further configured to:
  receive a response transmission including a block acknowledgement, the response transmission being received after a passage of a time interval defined by a short interframe space (SIFS).

8. The access terminal of claim 1, wherein the detected preceding transmission comprises one of an uplink transmission from a transmitter device or a response transmission addressed to the transmitter device.

9. A method operational on an access terminal, the method comprising:
  receiving a transmission including an instruction for the access terminal to follow a preceding transmission during a transmission sequence;
  suspending a backoff-based access to an uplink channel in response to the receipt of the transmission including the instruction for the access terminal to follow the preceding transmission;
  detecting the preceding transmission; and
  transmitting a transmission, via the communications interface, after a duration of an interframe space following the detected preceding transmission.

10. The method of claim 9, wherein receiving the transmission comprises receiving a transmission in an Institute of Electrical Engineers (IEEE) 802.11 wireless local area network (WLAN).

11. The method of claim 9, wherein receiving the transmission including the instruction to follow the preceding transmission comprises receiving the transmission including an instruction to follow the preceding transmission comprising an identifier that is associated with a transmitter device that the access terminal is assigned to follow.

12. The method of claim 11, wherein receiving the transmission including the instruction to follow the preceding transmission comprising the identifier associated with the transmitter device comprises receiving the transmission including the instruction to follow the preceding transmission comprising a media access control (MAC) address of the transmitter device.

13. The method of claim 9, wherein transmitting the transmission after the duration of the interframe space comprises transmitting the transmission after the duration of a time interval defined by one of a short interframe space (SIFS), a point coordination function (PCF) interframe space (PIFS), a distributed coordination function (DCF) interframe space (DIFS), or an arbitration interframe space (AIFS).

14. The method of claim 9, wherein transmitting the transmission includes transmitting a clear-to-send (CTS) frame addressed to the access terminal or a Null frame when there is no other information prepared to be included in the transmitted transmission.

15. The method of claim 9, wherein transmitting the transmission includes transmitting data, and further comprising:
  receiving a response transmission including a block acknowledgement, the response transmission being received after a duration of a time interval defined by a short interframe space (SIFS).

16. The method of claim 9, wherein detecting the preceding transmission comprises detecting one of an uplink transmission from a transmitter device or a response transmission addressed to the transmitter device.

17. An access terminal, comprising:
  means for receiving a transmission including an instruction for the access terminal to follow a preceding transmission during a transmission sequence;
  means for suspending a backoff-based access to an uplink channel in response to the receipt of the transmission including the instruction for the access terminal to follow the preceding transmission;
  means for detecting the preceding transmission; and
  means for transmitting a transmission after a duration of an interframe space following the detected preceding transmission.

18. The access terminal of claim 17, further comprises means for facilitating wireless communications in an Institute of Electrical Engineers (IEEE) 802.11 wireless local area network (WLAN).

19. The access terminal of claim 17, wherein the interframe space comprises a time interval defined by one of a short interframe space (SIFS), a point coordination function (PCF) interframe space (PIFS), a distributed coordination function (DCF) interframe space (DIFS), or an arbitration interframe space (AIFS).

20. The access terminal of claim 17, wherein the preceding transmission includes an identifier that is associated with a transmitter device that the access terminal is assigned to follow.

21. The access terminal of claim 20, wherein the identifier associated with the transmitter device comprises a media access control (MAC) address of the transmitter device.

22. A non-transitory processor-readable medium comprising one or more instructions operational on an access terminal, which, when executed by a processing circuit, causes the processing circuit to:
  receive a transmission including an instruction for the access terminal to follow a preceding transmission during a transmission sequence;
  suspend a backoff-based access to an uplink channel in response to the receipt of the transmission including the instruction for the access terminal to follow the preceding transmission;
  detect the preceding transmission; and
  transmit a transmission after a duration of an interframe space following the detected preceding transmission.

23. The processor-readable medium of claim 22, wherein the preceding transmission includes an identifier that is associated with a transmitter device that the access terminal is assigned to follow.

24. The processor-readable medium of claim 23, wherein the identifier associated with the transmitter device comprises a media access control (MAC) address of the transmitter device.

25. The processor-readable medium of claim 22, wherein the interframe space comprises a time interval defined by one of a short interframe space (SIFS), a point coordination function (PCF) interframe space (PIFS), a distributed coordination function (DCF) interframe space (DIFS), or an arbitration interframe space (AIFS).

26. An access point, comprising:
  a communications interface configured to facilitate wireless communications; and
  a processing circuit coupled to the communications interface, the processing circuit configured to:
    transmit to each access terminal of a plurality of access terminals, via the communications interface, a transmission including an instruction for each access terminal to follow a respective preceding transmission during a transmission sequence;
    suspend a backoff-based access to an uplink channel in response to the receipt of the transmission including the instruction for the access terminal to follow the preceding transmission; and receive, via the communications interface, a transmission from each of the plurality of access terminals in a sequential order according to the transmission sequence.

27. The access point of claim 26, wherein the transmitted transmission comprises a parallel SDMA transmission.

28. The access point of claim 27, wherein the transmitted transmission further includes data for each access terminal of the plurality of access terminals and a block acknowledgement request.

29. The access point of claim 26, wherein the transmitted transmission comprises a non-parallel group transmission.

30. The access point of claim 26, wherein the processing circuit is further configured to manage a plurality of transmission sequences by repeatedly communicating an identification (ID) frame to initiate each transmission sequence, each identification (ID) frame including the respective instruction transmitted to each access terminal.

31. The access point of claim 30, wherein the processing circuit is configured to insert a regular backoff after each transmission sequence and before a subsequent identification (ID) frame by waiting for a duration of the backoff before transmitting the subsequent identification (ID) frame.

32. The access point of claim 30, wherein the processing circuit is further configured to monitor an activity level of each access terminal to determine whether a respective identification (ID) frame should be transmitted to each access terminal.

33. The access point of claim 30, wherein the processing circuit is further configured to disable the transmission sequence by transmitting to the plurality of access terminals one of an ID disable frame, or an identification (ID) frame that includes an instruction for each access terminal to follow no preceding transmission.

34. The access point of claim 26, wherein at least one of the received transmissions includes uplink data, and the processing circuit is further configured to:
transmit a response transmission including a block acknowledgement to acknowledge receipt of the at least one received transmission including the uplink data, the response transmission being transmitted after a passage of a time interval defined by a short interframe space (SIFS).

35. The access point of claim 26, wherein each respective preceding transmission includes an identifier that is associated with a transmitter device that each access terminal is assigned to follow.

36. The access point of claim 35, wherein the identifier associated with the transmitter device comprises a media access control (MAC) address of the transmitter device.

37. A method operational on an access point, the method comprising:
identifying a sequence for distributed transmissions for a plurality of access terminals;
transmitting to each access terminal of the plurality of access terminals a transmission including an instruction for each access terminal to follow a respective preceding transmission according to the identified sequence;
suspending a backoff-based access to an uplink channel in response to the receipt of the transmission including the instruction for the access terminal to follow the preceding transmission; and
receiving a transmission from each of the plurality of access terminals in a sequential order according to the identified sequence.

38. The method of claim 37, wherein transmitting the transmission comprises transmitting a parallel SDMA transmission.

39. The method of claim 38, wherein transmitting a parallel SDMA transmission comprises transmitting data and a block acknowledgement request to each access terminal of the plurality of access terminals.

40. The method of claim 37, wherein transmitting the transmission comprises transmitting a non-parallel group transmission.

41. The method of claim 37, further comprising:
managing a plurality of transmission sequences by repeatedly communicating an identification (ID) frame to initiate each transmission sequence, each identification (ID) frame including the respective instruction transmitted to each of the plurality of access terminals.

42. The method of claim 41, further comprising:
inserting a regular backoff after each transmission sequence and before a subsequent identification (ID) frame.

43. The method of claim 41, further comprising:
monitoring an activity level of each access terminal to determine whether a respective identification (ID) frame should be transmitted to each access terminal.

44. The method of claim 37, further comprising:
disabling the distributed transmissions by transmitting to the plurality of access terminals one of an ID disable frame, or an identification (ID) frame that includes an instruction for each access terminal to follow no preceding transmission.

45. The method of claim 37, wherein receiving a transmission from each of the plurality of access terminals includes receiving at least one transmission including data; and further comprising:
transmitting a response transmission including a block acknowledgement to acknowledge receipt of the at least one received transmission including the data, the response transmission being transmitted after a passage of a time interval defined by a short interframe space (SIFS).

46. The method of claim 37, wherein transmitting a transmission including an instruction for each access terminal to follow a respective preceding transmission includes transmitting a transmission including an instruction for each access terminal to follow a respective preceding transmission that comprises an identifier that is associated with a transmitter device that each access terminal is assigned to follow.

47. The method of claim 46, wherein transmitting a transmission including an instruction for each access terminal to follow a respective preceding transmission that comprises an identifier associated with a transmitter device comprises transmitting a transmission including an instruction for each access terminal to follow a respective preceding transmission that comprises a media access control (MAC) address of the transmitter device.

48. An access point, comprising:
means for identifying a sequence for distributed uplink transmissions for a plurality of access terminals;
means for transmitting to each access terminal of the plurality of access terminals a transmission including an instruction for each access terminal to follow a respective preceding transmission according to the identified sequence;
means for suspending a backoff-based access to an uplink channel in response to the receipt of the transmission including the instruction for the access terminal to follow the preceding transmission; and means for receiving a transmission from each of the plurality of access terminals in a sequential order according to the identified sequence.

49. The access point of claim 48, wherein each respective preceding transmission includes an identifier that is associated with a transmitter device that each access terminal is assigned to follow.

50. The access point of claim 49, wherein the identifier associated with the transmitter device comprises a media access control (MAC) address of the transmitter device.

51. A non-transitory processor-readable medium comprising one or more instructions operational on an access point, which when executed by a processing circuit, causes the processing circuit to:
   transmit to each access terminal of a plurality of access terminals a transmission including an instruction for each access terminal to follow a respective preceding transmission during a transmission sequence;
   suspend a backoff-based access to an uplink channel in response to the receipt of the transmission including the instruction for the access terminal to follow the preceding transmission; and
   receive a transmission from each of the plurality of access terminals in a sequential order according to the transmission sequence.

52. The processor-readable medium of claim 51, wherein each respective preceding transmission includes an identifier that is associated with a transmitter device that each respective access terminal is assigned to follow.

53. The processor-readable medium of claim 52, wherein the identifier associated with the transmitter device comprises a media access control (MAC) address of the transmitter device.

* * * * *